(12) United States Patent
Xie et al.

(10) Patent No.: US 9,775,102 B2
(45) Date of Patent: Sep. 26, 2017

(54) ESTIMATING A RELATIVE DIFFERENCE BETWEEN SIGNAL STRENGTHS OF WIRELESS SIGNALS RECEIVED BY A DEVICE

(71) Applicant: Aruba Networks, Inc., Sunnyvale, CA (US)

(72) Inventors: Jin Xie, Sunnyvale, CA (US); Jiwoong Lee, San Jose, CA (US); Sachin Ganu, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 330 days.

(21) Appl. No.: 14/445,635

(22) Filed: Jul. 29, 2014

(65) Prior Publication Data
US 2016/0037424 A1 Feb. 4, 2016

(51) Int. Cl.
*H04W 48/16* (2009.01)
*H04W 52/02* (2009.01)
*H04W 52/24* (2009.01)
*H04W 48/20* (2009.01)

(52) U.S. Cl.
CPC ....... *H04W 48/16* (2013.01); *H04W 52/0245* (2013.01); *H04W 52/245* (2013.01); *H04W 48/20* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 6,745,044 B1* | 6/2004 | Holtzman | ........... | H04W 52/223 370/318 |
| 7,171,211 B2* | 1/2007 | Muller | ................ | H04B 17/327 455/115.1 |
| 7,418,269 B2* | 8/2008 | Edwards | ............. | H04W 72/082 370/331 |
| 7,881,720 B2* | 2/2011 | Huang | ................. | H04W 16/20 455/446 |
| 7,912,113 B2* | 3/2011 | Sayana | ............... | H04B 17/336 370/318 |
| 8,311,018 B2* | 11/2012 | Carlson | .................. | G01S 5/021 370/254 |
| 8,331,951 B2* | 12/2012 | Zhang | .................. | H04W 16/04 455/453 |
| 8,380,220 B2* | 2/2013 | Alles | ...................... | G01S 5/021 370/310.2 |

(Continued)

*Primary Examiner* — Gregory Sefcheck
(74) *Attorney, Agent, or Firm* — Hewlett Packard Enterprise Patent Department

(57) ABSTRACT

Methods and systems are described for determining an optimal access point for a client device based on the relative difference between signal strengths of wireless signals received by the client device from access points. In particular, the signal strengths of wireless signals received by a client device from access points are determined without receipt of signal strength and/or transmit power information from the client device. Instead, the signal strength difference value may be determined based on known characteristics of signals transmitted by the access points and known characteristics of signals received by the access points from the client device. This relative difference value may thereafter be used to determine an appropriate access point to provide network access to the client device.

20 Claims, 6 Drawing Sheets

(56) References Cited

U.S. PATENT DOCUMENTS

| | | | |
|---|---|---|---|
| 8,521,158 B2* | 8/2013 | Karpoor | H04W 48/16 370/331 |
| 8,543,065 B2* | 9/2013 | Karpoor | H04W 52/146 455/522 |
| 8,989,033 B2* | 3/2015 | Song | H04L 1/0015 370/252 |
| 9,171,117 B2* | 10/2015 | Berkovitz | G06F 17/5022 |
| 9,210,707 B2* | 12/2015 | Qiu | H04W 72/0453 |
| 9,215,675 B2* | 12/2015 | Kim | H04W 52/325 |
| 9,380,479 B2* | 6/2016 | Dabirmoghaddam | H04W 24/08 |

* cited by examiner

ESTIMATING A RELATIVE DIFFERENCE BETWEEN SIGNAL STRENGTHS OF WIRELESS SIGNALS RECEIVED BY A DEVICE

TECHNICAL FIELD

The present disclosure relates to determining the relative difference between signal strengths of wireless signals received by a client device from access points without receipt of signal strength and/or transmit power information from the client device. This relative difference value may thereafter be used to determine an appropriate access point to provide network access to the client device.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, multiple access points may jointly serve a common area. Accordingly, a client device operating in this area may be able to associate with two or more of the access points such that the access points may provide network access to the client device. Although the client device may have many options with respect to access point association, to ensure efficient communications the network system must determine an optimal access point for the client device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
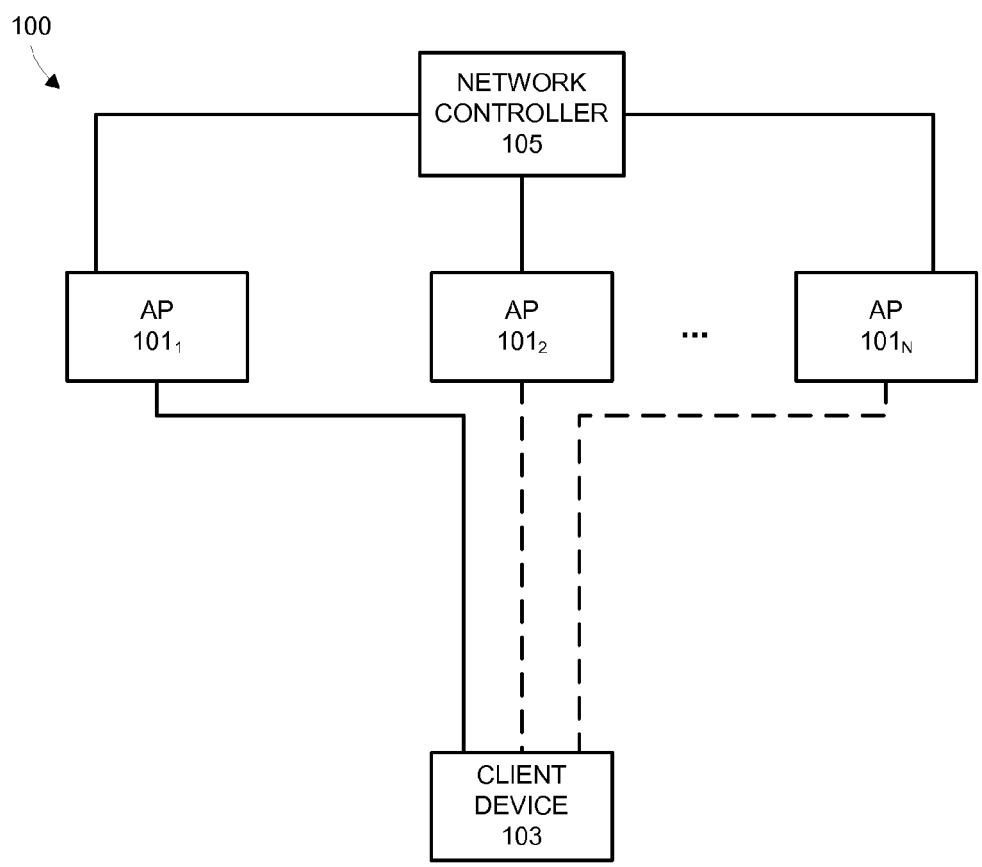
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$ (N>1), a client device 103, and a network controller 105. The client device 103 may be associated with one of the access points $101_1$-$101_N$ through a corresponding wireless connection such that the client device 103 is provided with network access (i.e., access to an internal network in which the access points $101_1$-$101_N$ operate and/or access to an external network via the access points $101_1$-$101_N$). Although the client device 103 may be associated with a single access point $101_1$-$101_N$ at a time, each of the access points $101_1$-$101_N$ may be able to detect wireless signals transmitted from the client device 103, and the client device 103 may be able to detect wireless signals transmitted by multiple access points $101_1$-$101_N$.

In one embodiment, one or more devices in the network system 100 may operate to determine the relative difference between signal strengths of wireless signals received by the client device 103 from two of the access points $101_1$-$101_N$ without receipt of signal strength and/or transmit power information from the client device 103. This relative difference value may describe the view of the access points $101_1$-$101_N$ from the client device 103 and may thereafter be used to determine an appropriate access point $101_1$-$101_N$ to provide network access to the client device 103. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional client devices 103.

Figure 2:
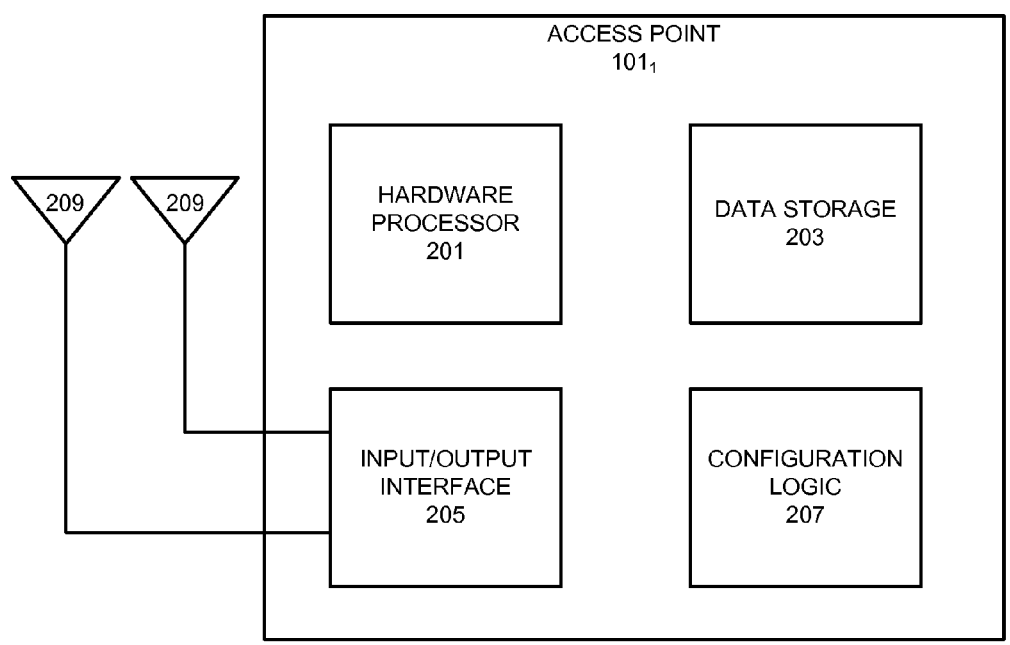
FIG. 2 shows a component diagram of an access point according to one embodiment.

The access points $101_1$-$101_N$ may be any device that can associate with the client device 103 to transmit and receive data over wireless channels and/or detect wireless signals transmitted by the client device 103. In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the access point $101_1$ may store data to be forwarded to the client device 103 or to one or more of the access points $101_2$-$101_N$. In another embodiment, the data storage 203 may store signal strength values for one or more wireless signals received from the client device 103.

In one embodiment, the I/O interface 205 corresponds to one or more components used for communicating with other devices (e.g., the client device 103, the controller 105, other access points $101_2$-$101_N$, and/or other devices within the system 100 or devices external to the system 100) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client device 103, the controller 105, and/or the access points $101_2$-$101_N$ over corresponding wireless channels in the system 100.

In some embodiments, the I/O interface 205 may include one or more antennas 209 for communicating with the client device 103, the controller 105, the access points $101_2$-$101_N$, other wireless devices in the network system 100, and/or other devices over an external network. For example, multiple antennas 209 may be used for forming transmission beams to one or more of the client device 103 and/or the access points $101_2$-$101_N$ through adjustment of gain and phase values for corresponding antenna 209 transmissions. The generated beams may avoid objects and create an unobstructed path to the client device 103 and/or the access points $101_2$-$101_4$. In some embodiments, the multiple antennas 209 may be used for performing multipath transmissions and receiving multiple transmissions from the client device 103 or another wireless network device.

In one embodiment, the I/O interface 205 in conjunction with the antennas 209 may detect wireless signals emitted by the client device 103. In this embodiment, the client device 103 may not be directly associated with the access point $101_1$ such that the client device 103 and the access point $101_1$ maintain a data connection, but the access point $101_1$ is still able to detect the presence of the proximate/neighboring client device 103, including signal strength characteristics for corresponding wireless signals. For example, in FIG. 1 the dashed lines indicate that the client device 103 is visible to and/or in-range of the access points $101_2$ and $101_N$, although the access points $101_2$ and $101_N$ and the client device 103 may not share a data connection. Instead, the client device 103 is only associated and maintains a data connection with the access point $101_1$ (e.g., a data connection using one or more network protocols), as signified by the solid line. Accordingly, each of the access points $101_2$ and $101_N$ may detect nearby signals of the client device 103 even without an established data connection. Detection of these signals by the access points $101_1$-$101_N$ may be used to determine strength characteristics as will be described in greater detail below.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to determine the relative difference between signal strengths of wireless signals received by the client device 103 without receipt of signal strength and/or transmit power information from the client device 103. This relative difference value may thereafter be used to determine an appropriate access point $101_1$-$101_N$ to provide network access to the client device 103.

As described above, the other access points $101_2$-$101_N$ may be similarly configured as described above in relation to the access point $101_1$. For example, access points $101_2$-$101_N$ may comprise hardware processor 201, data storage 203, input/output (I/O) interface 205, and device configuration logic 207 in a similar fashion as described above in relation to the access point $101_1$.

In one embodiment, the controller 105 may be similarly configured as described above in relation to the access point $101_1$. For example, the controller 105 may comprise hardware processor 201, data storage 203, input/output (I/O) interface 205, and device configuration logic 207 in a similar fashion as described above in relation to the access point $101_1$.

In one embodiment, the client device 103 may be any wireless electronic device(s) capable of receiving and/or transmitting data over wireless mediums. For example, the client device 103 may be one or more of a personal computer, a laptop computer, a netbook computer, a wireless music player, a portable communication device, a smart phone, a tablet computer, and a digital television. In one embodiment, the client device 103 is a digital device that includes a hardware processor, memory hierarchy, and input/output (I/O) interfaces including a wired and/or wireless interface such as an IEEE 802.11 interface. In one embodiment, the configuration of the components within the client device 103 may be similar to those discussed above in relation to the access point $101_1$. For example, the client device 103 may comprise hardware processor 201, data storage 203, input/output (I/O) interface 205, and device configuration logic 207 in a similar fashion as described above in relation to the access point $101_1$.

Estimating the Relative Difference Between Signal Strength Values Received by the Client Device 103 from Multiple Access Points 101

In some systems, client devices 103 may continually update their view of the access points $101_1$-$101_N$. For example, IEEE 802.11k provides a protocol for allowing client devices 103 to respond to beacon requests from access points $101_1$-$101_N$. The responses to beacon requests may include received signal strength values for signals received from access points $101_1$-$101_N$ and/or transmission powers for signals transmitted from the client devices 103. However, some client devices 103 are not equipped/designed to transmit such information. Accordingly, while the upstream view from the client device 103 may be known based on information from the access points $101_1$-$101_N$, the downstream view from the client device 103 may be unknown when performing particular network operations. For example, matching the client device 103 to access points $101_1$-$101_N$ may be performed without knowledge of the downstream view from the client devices 103.

Figure 3:
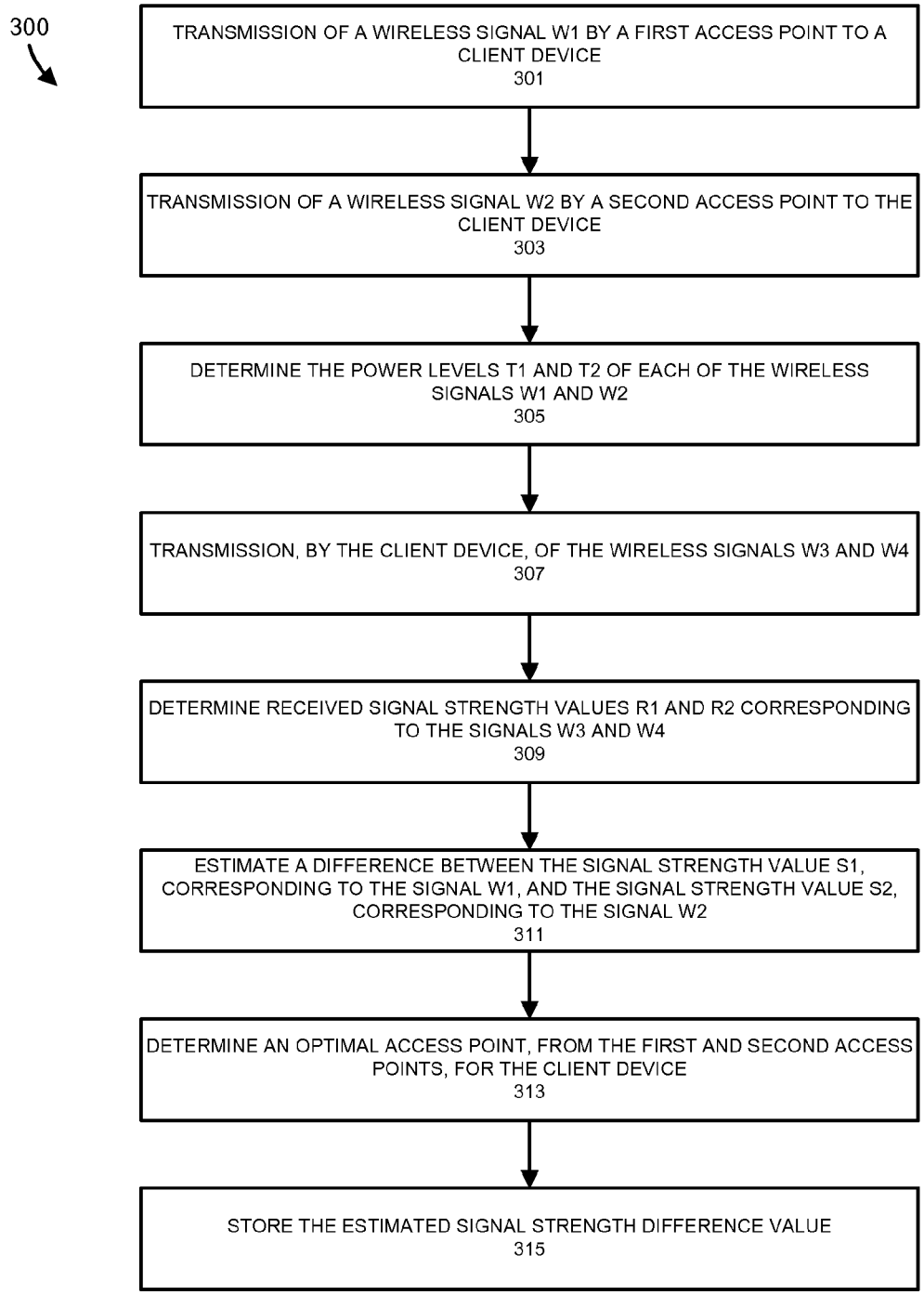
FIG. 3 shows a method for estimating the relative difference between signal strength values of corresponding wireless signals received by a client device from multiple access points according to one embodiment.

Turning now to FIG. 3, a method 300 for estimating the relative difference between signal strength values of corresponding wireless signals received by the client device 103 from multiple access points $101_1$-$101_N$ according to one embodiment will be described. This difference values may provide an estimate of the downstream view from the client device 103, which in turn may be used to select an optimal access point $101_1$-$101_N$ for providing network access to the client device 103. In one embodiment, each operation of the method 300 may be performed by one or more components of the access points $101_1$-$101_N$, the controller 105, and/or another network component.

Although the operations of the method 300 are shown and described in a particular order, in other embodiments the operations may be performed in a different order. For example, in some embodiments, the operations of the method 300 may be performed concurrently and/or during overlapping time periods.

Figure 4:
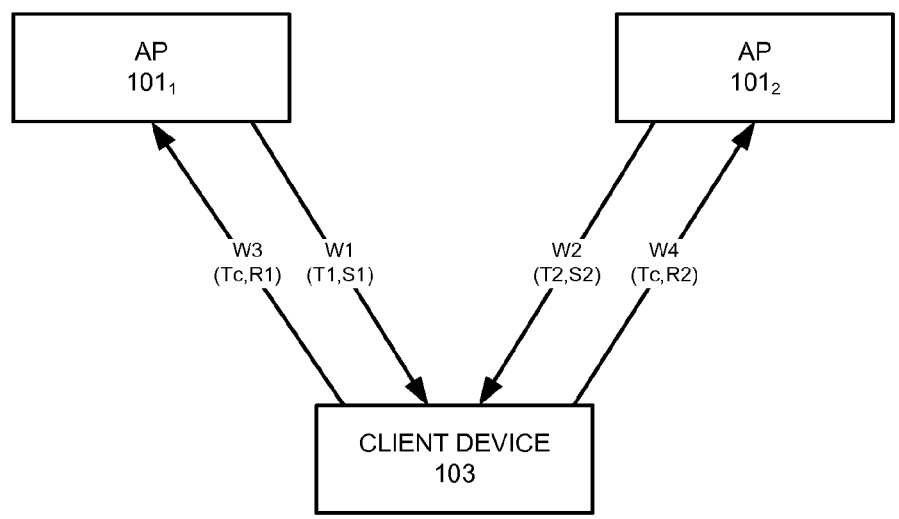
FIG. 4 shows wireless signals transmitted between two access points and a client device according to one embodiment.

In one embodiment, the method 300 may begin at operation 301 with the transmission of a wireless signal W1 by the access point $101_1$ to the client device 103 as shown in FIG. 4. The wireless signal W1 transmitted at operation 301 may be part of a data communication between the access point $101_1$ and the client device 103. For example, the client device 103 may be associated with the access point $101_1$ such that the client device 103 and the access point $101_1$ maintain a data connection, as noted by the solid line in FIG. 1. In this embodiment, the wireless signal W1 from operation 301 may be based on a wireless transmission of data from the access point $101_1$ to the client device 103 (e.g., application data and/or control signals). However, in other embodiments, the wireless signal W1 transmitted at operation 301 may be a general signal that is detected by the client device 103, but does not necessarily transmit data or is associated with a data connection with the client device 103. In this embodiment, the client device 103 may be in range of the access point $101_1$ such that the client device 103 is able to detect wireless signals produced/emitted by the access point $101_1$ (i.e., the wireless signal W1), but the access point $101_1$ and the client device 103 are not associated such that a data connection has been established.

Following, prior to, or concurrently with operation 301, the access point $101_2$ may transmit a wireless signal W2 to the client device 103 at operation 303 as shown in FIG. 4. Similar to operation 301, the transmission by the access point $101_2$ at operation 303 may communicate data to the client device 103 (e.g., application data and/or control signals) when the access point $101_2$ and the client device 103 have established a data connection. However, in other embodiments, the access point $101_2$ may emit a wireless signal that is detected by the client device 103 without the establishment of a data connection. Accordingly, the client device 103 may be in range of the access point $101_2$ such that the client device 103 is able to detect wireless signals produced/emitted by the access point $101_2$, but the access point $101_2$ and the client device 103 are not associated such that a data connection has been established.

Following the transmission of wireless signals W1 and W2 at operations 301 and 303, respectively, operation 305 may determine the power levels T1 and T2 of each of the wireless signals W1 and W2 transmitted at operations 301 and 303. For example, the signal W1 from the access point $101_1$ may have been transmitted at 10 dBm (i.e., T1=10 dBm) while the signal W2 from the access point $101_2$ may have been transmitted at 20 dBm (i.e., T2=10 dBm). In one embodiment, the power levels T1 and T2 may have been determined by the access points $101_1$ and $101_2$ and the access points $101_1$ and $101_2$ may upload their corresponding power levels T1 and T2 of the transmitted wireless signals W1 and W2 to the controller 107 or another repository. In this embodiment, operation 305 may retrieve the power level values T1 and T2 from the controller 105 or another centralized location at operation 305.

At operation 307, the client device 103 may transmit wireless signals W3 and W4 as shown in FIG. 4, which are detected by the access points $101_1$ and $101_2$, respectively.

While operations 301 and 303 dealt with transmissions from the access points $101_1$ and $101_2$ to the client device 103, operation 307 deals with transmissions in the opposite direction (i.e., wireless signals W3 and W4 transmitted from the client device 103 and received by the access points $101_1$ and $101_2$, respectively). The wireless signals W3 and W4 from operation 307 may be based on data transmissions over an established data connection between the client device 103 and the access points $101_1$ and/or $101_2$ or the wireless signals W3 and W4 received at operation 307 may not be made over an established data connection between the client device 103 and the access points $101_1$ and/or $101_2$. For example, the access points $101_1$ and/or $101_2$ may be in range of the client device 103 such that the access points $101_1$ and/or $101_2$ may detect the corresponding wireless signals W3 and W4 generally transmitted by the client device 103. In one embodiment, the wireless signals W3 and W4 received by each of the access points $101_1$ and $101_2$ at operation 307 may be from the same transmission from the client device 103.

At operation 309, the method 300 may determine received signal strength values R1 and R2 corresponding to the signals W3 and W4 received by the access points $101_1$ and $101_2$, respectively, from the client device 103 at operation 307. The received signal strength values R1 and R2 for these signals W3 and W4 may be measured by each of the access points $101_1$ and $101_2$. For example, the received signal strength value R1 may be 50 dB while the received signal strength value R2 may be 47 dB. In one embodiment, the signal strength values R1 and R2 of the signals W3 and W4 received from the client device 103 may be Received Signal Strength Indicators (RSSIs).

In some embodiments, the received signal strength values R1 and R2 for each of the access points $101_1$ and $101_2$ may be any value computed based on one or more signals received by a receiving device (e.g., the access points $101_1$ and/or $101_2$). For example, the signal W3 transmitted by the client device 103 at operation 307 may be reflected or otherwise duplicated before reaching the access point $101_1$. Each of these duplicated signals may be received by the access point $101_1$ with a corresponding separate signal strength. In another embodiment, multiple transmission antennas on the client device 103 may emit the signals W3 and W4 (e.g., multipath transmissions). These multiple transmission of each of the signals W3 and W4 may result in corresponding multiple signal strengths for each of the access points $101_1$ and $101_2$. Operation 309 may determine the received signal strength values R1 and R2 based on one or more of these received signals. In one embodiment, statistical functions maybe used for computing the received signal strength values R1 and R2. For example, an average, a maximum, and/or a minimum value for multiple wireless signals received by a single access point $101_1$ or $101_2$ from the client device 103 may be used to compute the received signal strength values R1 and R2. Accordingly, even though operation 309 is described herein in relation to the signals W3 and W4, it is understood that the values R1 and R2 may be computed based on multiple received signals. In some embodiments, signal strength values may be weighted based on known obstacles encountered by the signals.

In one embodiment, the access points $101_1$ and $101_2$ may periodically upload received signal strength values R1 and R2, corresponding to transmissions from the client device 103, to the controller 105. In this embodiment, the controller 105 may hold a recorded copy of signal strength values R1 and R2 for each of the access points $101_1$ and $101_2$. Accordingly, in one embodiment, at operation 309 the recorded values R1 and R2 may be accessed/retrieved from the controller 105.

Following determination of power level values T1 and T2 at operation 305 and signal strength values R1 and R2 at operation 309, operation 311 may estimate a difference between the signal strength S1, corresponding to the signal W1 transmitted at operation 301, and the signal strength S2, corresponding to the signal W2 transmitted at operation 303. Accordingly, operation 311 may estimate the value of S1-S2. In one embodiment, this estimation is based on the transmit power values T1 and T2 of the signals W1 and W2 transmitted at operations 301 and 303, as determined at operation 305, and the signal strength values R1 and R2 for the signals W3 and W4 transmitted from the client device 103 to the access points $101_1$ and $101_2$, as determined at operation 309. In this embodiment, operation 311 may estimate the difference between the signal strength values S1 and S2 based only on input from the access points $101_1$ and $101_2$ and/or the controller 105. In particular, although the client device 103 may transmit signals W3 and W4, which may be analyzed by the access points $101_1$ and $101_2$ or other network devices (e.g., the controller 105), the client device 103 may not provide signal strength values (e.g., the values S1 and S2 corresponding to the received signals W1 and W2) or the power level values (e.g., the power level Tc used to transmit the signals W3 and W4). Accordingly, the difference between these values S1 and S2, may be determined purely from strength and power levels known/determined by the access points $101_1$ and $101_2$ and/or the network controller 105.

Figure 5:
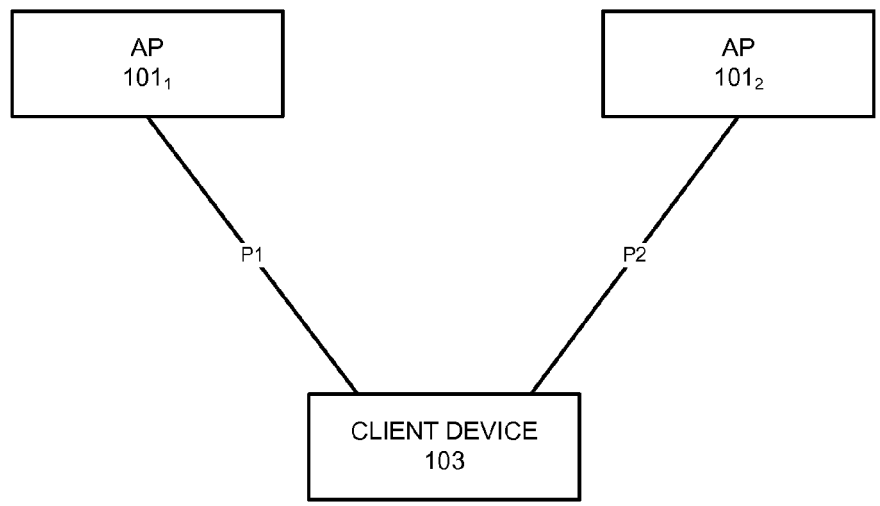
FIG. 5 shows the path loss between two access points and a client device according to one embodiment.

For example, the signal strength value S1 for the signal W1 may be calculated as the difference between the transmit power T1 of the signal W1 and the path loss P1 between the access point $101_1$ and the client device 103. As shown in FIG. 5, the path loss P1 represents the power drop in signals transmitted between the access point $101_1$ and the client device 103. The path loss P1 may be a characterization of environmental factors that cause a transmitted signal to decrease in power while propagating from the transmission device to the receiving device. In one embodiment, the signal strength value S1 may be represented by the equation below:

$$S1 = T1 - P1 \qquad \text{Equation 1}$$

Similarly, the signal strength value S2 for the signal W2 may be calculated as the difference between the transmit power T2 of the signal W2 and the path loss P2 between the access point $101_2$ and the client device 103. As shown in FIG. 5, the path loss P2 represents the power drop in signals transmitted between the access point $101_2$ and the client device 103 as a result of environmental factors as described above. Accordingly, the signal strength value S2 may be represented by the equation below:

$$S2 = T2 - P2 \qquad \text{Equation 2}$$

In one embodiment, the path loss upstream and downstream may be assumed to be symmetrical (i.e., symmetrical channel model upstream and downstream between each access point $101_1$-$101_N$ and the client device 103). Based on the above equations, the difference between the signal strength values S1 and S2 may be represented as:

$$S1 - S2 = T1 - T2 + (P2 - P1) \qquad \text{Equation 3}$$

As noted above, the path loss values P1 and P2 in the above equations may be based on various factors, including objects between the access points $101_1$ and $101_2$ and the client device 103. Although the power levels T1 and T2 are known based on the determination at operation 305, the values P1 and P2 may be unknown. In particular, as described above, since operation 311 is operating without signal strength values (e.g., S1 and S2) and/or power level values (e.g., Tc) from the client device 103, path loss between the access points $101_1$ and $101_2$ and the client device 103 characterized by P1 and P2, may be unknown.

To remove the unknown values P2 and P1 from the above difference equation, the relationship between the known signal strength values R1 and R2 and the path loss values P1 and P2 may be exploited. In particular, the signal strength value R1 for the signal W3 may be calculated as the difference between the transmit power Tc of the signal W3 and the path loss P1 between the access point $101_1$ and the client device 103. Accordingly, the signal strength value R1 may be represented by the equation below:

$$R1 = Tc - P1 \quad \text{Equation 4}$$

Similarly, the signal strength value R2 for the signal W4 may be calculated as the difference between the transmit power Tc of the signal W4 and the path loss P2 between the access point $101_2$ and the client device 103. Accordingly, the signal strength value R2 may be represented by the equation below:

$$R2 = Tc - P2 \quad \text{Equation 5}$$

As shown above, the transmit power of the client device 103 is assumed to be constant for all signals. Namely, both signals W3 and W4 are assumed to be transmitted at the power Tc by the client device 103. Based on the above R1 and R2 equations, the difference between the signal strength values R1 and R2 may be represented as:

$$R1 - R2 = P2 - P1 \quad \text{Equation 6}$$

Since the power level for each of the signals W3 and W4 is assumed to be the same (i.e., W3 and W4 are both transmitted at the power level Tc), the value Tc is cancelled out during the computation of the difference between the signal strength values R1 and R2.

Since the difference between R1 and R2 is equivalent to the difference between the P2 and P1, P2-P1 may be replaced with R1-R2 in Equation 3 above. Based on this replacement, the difference between the signal strength values S1 and S2 may be represented as:

$$S1 - S2 = (T2 - T2) + (R1 - R1) \quad \text{Equation 7}$$

Since both the power level values T1 and T2 of the wireless signals W1 and W2 are known from operation 305 and the signal strength values R1 and R2 are known from operation 309, Equation 7 may be used to determine the difference between the signal strength values S1 and S2 at operation 311. For example, using the example values shown above in relation to the power level values T1 and T2 and the signal strength values R1 and R2 (i.e., T1=10 dBm, T2=20 dBm, R1=50 dB, and R2=47 dB), the difference between the signal strength values S1 and S2 may be calculated as:

$$S1 - S2 = (10 \text{ dBm} - 20 \text{ dBM}) + (50 \text{ dB} - 47 \text{ dB})$$

$$S1 - S2 = -7 \text{ dB}$$

This difference value S1-S2 (e.g., -7 dB) represents the view of the access points $101_1$ and $101_2$ from the client device 103. Using this difference value S1-S2, operation 313 may determine an optimal access point $101_1$ or $101_2$ for the client device 103 to associate with. In particular, although the specific signal strength values S1 and S2 may not be individually known, their relationship may be characterized by their difference. For example, when the difference value S1-S2 is greater than zero, this may indicate that the signal strength value S1 is greater than the signal strength value S2. In this case, the access point $101_1$ associated with the signal strength value S1 may be a more appropriate device, in comparison to the access point $101_2$, to provide network access to the client device 103 since the signal strength S1 provided by the access point $101_1$ is estimated to be greater than the signal strength S2 provided by the access point $101_2$. Accordingly, operation 313 may select access point $101_1$ for the client device 103 to associate.

Conversely, when the difference value S1-S2 is less than zero, this may indicate that the signal strength value S2 is greater than the signal strength value S1. In this case, the access point $101_2$ associated with the signal strength value S2 may be a more appropriate device, in comparison to the access point $101_2$, to provide network access to the client device 103 since the signal strength S2 provided by the access point $101_2$ is estimated to be greater than the signal strength S1 provided by the access point $101_1$. Accordingly, operation 313 may select access point $101_2$ for the client device 103 to associate.

Figure 6:
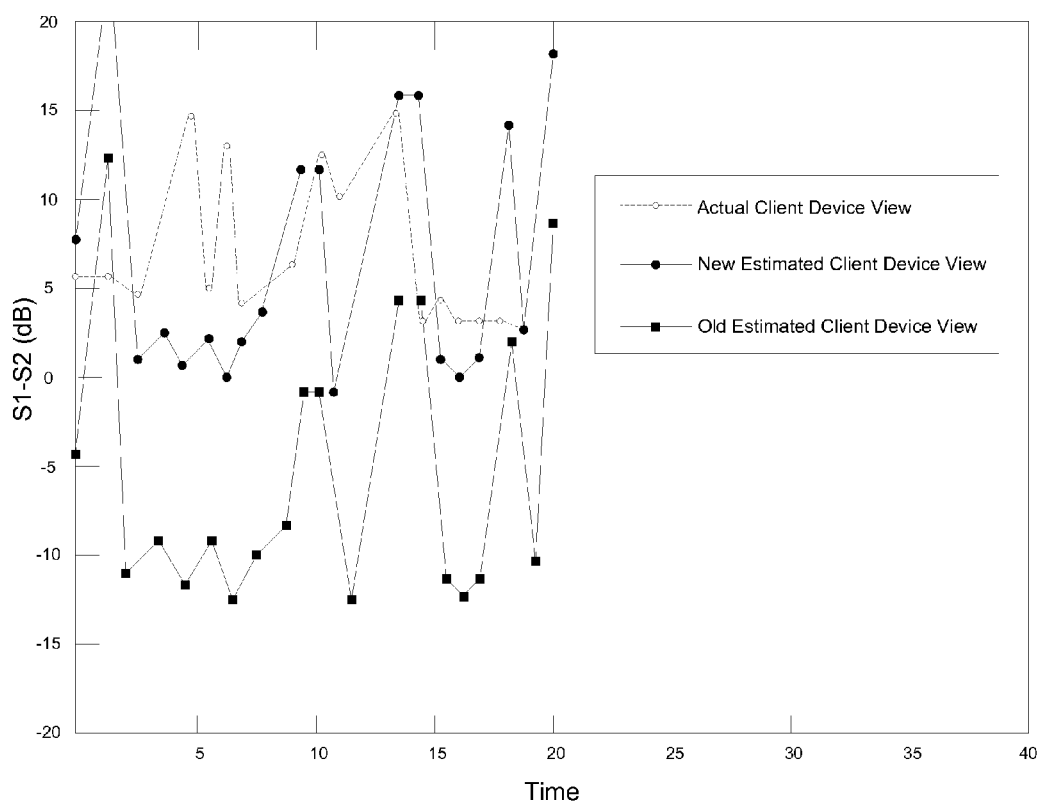
FIG. 6 shows a graph of 1) actual signal strength difference values as measured in testing, 2) estimated signal strength difference values, and 3) the actual signal strength values used by traditional systems according to one embodiment.

As described above, the value of S1-S2 may be used as a factor in determining an access point $101_1$-$101_N$ for the client device 103 to associate. In traditional network systems in which a client device 103 did not provide power level and/or signal strength values, the decision of access point $101_1$-$101_N$ association for the client device 103 was made based on the difference between R1 and R2 (i.e., the difference between the signal strength values R1 and R2 corresponding to the wireless signals W1 and W2 transmitted from the client device 103). FIG. 6 shows a graph of 1) actual signal strength difference values S1-S2 as measured in testing, 2) estimated signal strength difference values S1-S2 as computed by the method 300 described above, and 3) the actual signal strength values R1-R2 used by traditional systems. In this graph of FIG. 6, the power levels T1 and T2 for two corresponding access points 101 may be 21 dBm and 9 dBm, respectively. As shown, the estimated signal strength difference values S1-S2 as computed by the method 300 (i.e., "New Estimated Client Device View") are tightly related to the actual signal strength difference values S1-S2 as tested in comparison to the actual signal strength difference values R1-R2 (i.e., "Old Estimated Client Device View"). In particular, the estimated signal strength difference values S1-S2 consistently provide values closer to the actual signal strength values S1-S2 in comparison to the actual signal strength difference values R1-R2, which traditional systems assume are equivalent to S1-S2. As shown in FIG. 6, the estimated value S1-S2 is often on the same side of the center axis in relation to the actual value S1-S2 (e.g., above or below zero). As noted above, by knowing when the value S1-S2 is negative or positive may provide a strong indication of what access point $101_1$ or $101_2$ is best suited for the client device 103. Accordingly, by using the estimated signal strength difference value S1-S2, which is computed using transmission powers T1 and T2 of the access points $101_1$ and $101_2$, the method 300 may make client device 103 association decisions that more accurately reflect the downstream client device 103 view in comparison to traditional systems that utilize the signal strength difference value R1-R2.

Although described as operation 313 determining an optimal access point association based solely on the estimated signal strength difference value S1-S2, in other embodiments other factors may be also used by operation 313. For example, load on each of the access points $101_1$ and $101_2$, the number of client devices 103 associated with the access points $101_1$ and $101_2$, and/or the signal strength difference value R1-R2 may also be used for determining an optimal access point 101 association. Each of these factors may be used in conjunction with the signal strength difference value S1-S2 to determine an optimal access point 101 for the client device 103. In this fashion, the association decision for the client device 103 may incorporate upstream and downstream views relative to the client device 103.

As noted above, the client device 103 may already be associated with an access point $101_1$-$101_N$ at the commencement of the method 300. For example, the client device 103 may be associated with the access point $101_1$. In this embodiment, the method 300 may be performed for each pair of the access point $101_1$ and one of the access points $101_2$-$101_N$. In this embodiment, each of the corresponding difference values S1-S2 estimated for each pair of the access point $101_1$ and the access points $101_2$-$101_N$ may be compared to determine if there is a more optimal access point $101_2$-$101_N$ for the client device 103. For example, when the signal strength value S1 corresponds to the access point $101_1$ and the signal strength values $S2_2$-$S2_N$ correspond to the access points $101_2$-$101_N$, respectively, when each of the values S1-$S2_2$; S1-$S2_3$; . . . S1-$S1_N$ is greater than or equal to zero, operation 313 may determine that no access point 101 change is needed. However, when one or more of the values S1-$S2_2$; S1-$S2_3$; . . . S1-$S1_N$ is less than zero, the access point $101_2$-$101_N$ corresponding to the lowest value may be selected by operation 313 for the client device 103.

In one embodiment, a threshold value may be used to determine whether a change of access point 101 should be made. In this embodiment, when one or more of the values S1-$S2_2$; S1-$S2_3$; . . . S1-$S1_N$ is less than zero, but the value fails to fall below the threshold, then the client device 103 does not change from the access point $101_1$. In this embodiment, the threshold ensures that changes are not made for relatively small improvements in performance. Namely, the overhead involved in changing access point 101 association for the client device 103 may outweigh any performance gain for the client device 103 based on moving from the access point $101_1$ to one of the access points $101_2$-$101_N$. Accordingly, this threshold value may ensure that changes are only performed when significant improvements are expected as a result.

As described above, the client device 103 may be associated with one of the access points $101_1$-$101_N$ at commencement of the method 300. However, in other embodiments, the client device 103 may not be associated with an access point $101_1$-$101_N$ at commencement of the method 300. In this embodiment, the method 300 may be performed for every permutation of the access points $101_1$-$101_N$ to determine an optimal access point $101_1$-$101_N$ for association with the client device 103.

In one embodiment, operation 315 may store one or more of the determined signal strength difference values computed at operation 311 along with a determined location of the client device 103. The combination of these pieces of information may be a vector that provides a signature for a location within a physical area. For example, the location of the client device 103 may be determined based on satellite positioning data (e.g., Global Positioning System (GPS) data), signal strength triangulation data, and/or any other technique for determining the location of the client device 103. This set of difference values computed at operation 311 and location data may be stored and thereafter used by the client device 103 and/or another network device. In particular, upon another network device determining that they are at a particular location, this location may be used to look up one or more previously stored signal strength difference values. These difference values may be used for determining an optimal access point $101_1$-$101_N$ for the network device. Similarly, upon determining a signal strength difference value, a location of the network device may be determined based on a lookup using the previously stored locations and signal strength values.

As described above, the method 300 provides an estimate of the downstream view from the client device 103, which in turn may be used to select an optimal access point $101_1$-$101_N$ for providing network access to the client device 103. In contrast to traditional systems in which a downstream view from the client device 103 is sought to be estimated, the estimated view is generated 1) without signal strength data from the client device 103; 2) without environmental factors/path loss knowledge (i.e., P1 and P2) and independent to variances with environment/path loss; and 3) without knowledge of transmission powers of signals from the client device 103 (i.e., Tc).

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

determining a first transmit power used by a first access point for transmitting a first set of wireless signals to a client device;

determining a second transmit power used by a second access point for transmitting a second set of wireless signals to a client device;

determining a first received signal strength corresponding to a third set of wireless signals received by the first access point from the client device;

determining a second received signal strength corresponding to a fourth set of wireless signals received by the second access point from the client device;

based at least on the first transmit power, the second transmit power, the first received signal strength and the second received signal strength, estimating a difference value between (a) a third received signal strength corresponding to a strength of the first set of wireless signals as received by the client device and (b) a fourth received signal strength corresponding to a strength of the second set of wireless signals as received by the client device, wherein the estimated difference value is determined solely with signal strength data from a view of the first access point and signal strength data from a view the second access point.

2. The medium of claim 1, wherein the operations further comprise: based at least on the estimated difference value, selecting one of the first access point and the second access point for providing network access to the client device.

3. The medium of claim 2, wherein selecting one of the first access point and the second access point is further based on one or more of: the first received signal strength, the second received signal strength, a load on the first access point, or a load on the second access point.

4. The medium of claim 1, wherein the operations further comprise storing the estimated difference value in association with a location of the client device.

5. The medium of claim 1, wherein the third set of wireless signals received by the first access point and the fourth set of wireless signals received by the second access point correspond to a same set of signals transmitted by the client device.

6. The medium of claim 1, wherein estimating the difference value comprises: estimating the difference value as the addition of (a) a first difference value between the first transmit power and the second transmit power and (b) a second difference value between the first received signal strength and the second received signal strength.

7. The medium of claim 1, wherein computation of the estimated difference value is not based on an environmental factor which affects an amount of power lost while a wireless signal is propagating through air.

8. The medium of claim 7, wherein environmental factor includes a path loss between the first access point and the client device.

9. The system of claim 8, wherein the environmental factor further includes a path loss between the second access point and the client device.

10. The medium of claim 1, wherein the operations further comprise estimating a plurality of difference values using transmit power values and receiving strength values for a plurality of pairs of access point combinations and selecting an access point based at least on an estimated strongest received signal strength for the client device.

11. A system comprising:
a first access point including a hardware processor and a second access point including a hardware processor;
the system to perform operations comprising:
determining a first transmit power used by the first access point for transmitting a first set of wireless signals to a client device;
determining a second transmit power used by the second access point for transmitting a second set of wireless signals to a client device;
determining a first received signal strength corresponding to a third set of wireless signals received by the first access point from the client device;
determining a second received signal strength corresponding to a fourth set of wireless signals received by the second access point from the client device;
based at least on the first transmit power, the second transmit power, the first received signal strength and the second received signal strength, estimating a difference value between (a) a third received signal strength corresponding to a strength of the first set of wireless signals as received by the client device and (b) a fourth received signal strength corresponding to a strength of the second set of wireless signals as received by the client device, wherein the estimated difference value is determined without signal strength data from the view of the client device.

12. The system of claim 11, wherein the operations further comprise: based at least on the estimated difference value, selecting one of the first access point and the second access point for providing network access to the client device.

13. The system of claim 12, wherein selecting one of the first access point and the second access point is further based on one or more of: the first received signal strength, the second received signal strength, a load on the first access point, or a load on the second access point.

14. The system of claim 11, wherein the operations further comprise storing the estimated difference value in association with a location of the client device.

15. The system of claim 11, wherein the third set of wireless signals received by the first access point and the fourth set of wireless signals received by the second access point correspond to a same set of signals transmitted by the client device.

16. The system of claim 11, wherein estimating the difference value comprises: estimating the difference value as the addition of (a) a first difference value between the first transmit power and the second transmit power and (b) a second difference value between the first received signal strength and the second received signal strength.

17. The system of claim 11, wherein computation of the estimated difference value is not based on an environmental factor which affects an amount of power lost while a wireless signal is propagating through air.

18. The system of claim 17, wherein environmental factor includes a path loss between the first access point and the client device.

19. The system of claim 18, wherein the environmental factor further includes a path loss between the second access point and the client device.

20. The system of claim 11, wherein the operations further comprise estimating a plurality of difference values using transmit power values and receiving strength values for a plurality of pairs of access point combinations and selecting an access point based at least on an estimated strongest received signal strength for the client device.

* * * * *